United States Patent
Smith et al.

(10) Patent No.: US 11,653,129 B2
(45) Date of Patent: May 16, 2023

(54) MULTIMODAL AUDIO BROADCAST ASSEMBLY

(71) Applicants: Daimond Smith, Houston, TX (US); Michelle Smith, Houston, TX (US)

(72) Inventors: Daimond Smith, Houston, TX (US); Michelle Smith, Houston, TX (US)

(*) Notice: Subject to any disclaimer, the term of this patent is extended or adjusted under 35 U.S.C. 154(b) by 0 days.

(21) Appl. No.: 17/463,935

(22) Filed: Sep. 1, 2021

(65) Prior Publication Data
US 2023/0066353 A1 Mar. 2, 2023

(51) Int. Cl.
*H04R 1/02* (2006.01)
*H04R 1/10* (2006.01)
*G06F 1/16* (2006.01)

(52) U.S. Cl.
CPC ........... *H04R 1/025* (2013.01); *G06F 1/1632* (2013.01); *H04R 1/1016* (2013.01); *H04R 1/1025* (2013.01); *H04R 1/1041* (2013.01); *H04R 2420/07* (2013.01); *H04R 2460/17* (2013.01)

(58) Field of Classification Search
CPC .... H04R 1/025; H04R 1/1016; H04R 1/1025; H04R 1/1041; H04R 2420/07; H04R 2460/17; G06F 1/1632
See application file for complete search history.

(56) References Cited

U.S. PATENT DOCUMENTS

| | | | |
|---|---|---|---|
| 8,085,966 B2 | 12/2011 | Amsel | |
| 9,148,717 B2 | 9/2015 | Shaffer | |
| D772,572 S | 11/2016 | Palmborg | |
| 9,532,128 B2 | 12/2016 | Linden | |
| 9,769,558 B2* | 9/2017 | Chandramohan | .... H04B 1/3888 |
| 10,129,626 B1* | 11/2018 | Jung | ....... H02J 7/342 |
| 10,181,282 B2 | 1/2019 | McPeak | |
| 10,455,066 B2* | 10/2019 | Kim | ................. H04M 1/72412 |
| 2011/0002478 A1 | 1/2011 | Pollard | |
| 2019/0075385 A1* | 3/2019 | Lee | ...................... H04R 1/1025 |
| 2021/0297764 A1* | 9/2021 | Georgiades | .............. H04R 1/02 |
| 2021/0351601 A1* | 11/2021 | Chao | ....................... H02J 7/342 |

FOREIGN PATENT DOCUMENTS

| | | | | |
|---|---|---|---|---|
| CN | 210629797 U | * | 5/2020 | |
| KR | 101912899 B1 | * | 10/2018 | .......... H04R 1/1025 |
| WO | WO2009061223 | | 5/2009 | |
| WO | WO-2020111604 A1 | * | 6/2020 | ............. H04R 1/028 |

* cited by examiner

*Primary Examiner* — Angelica M McKinney (57) ABSTRACT

A multimodal audio broadcast assembly for selectively enabling individual and group listening includes a pair of earbuds and a docking station. Each earbud is selectively engageable a respective ear of a user so that the earbud is removably engaged to the respective ear. The earbuds can receive wirelessly an audio signal from an electronic device and can broadcast the audio signal into the ears of the user. The docking station operationally engages the pair of earbuds so that the docking station is positioned to charge the pair of earbuds. The docking station also can receive the audio signal from the electronic device. A dock speaker is engaged to the docking station and is positioned to selectively broadcast the audio signal.

11 Claims, 6 Drawing Sheets

MULTIMODAL AUDIO BROADCAST ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to broadcast assemblies and more particularly pertains to a new broadcast assembly for selectively enabling individual and group listening. The present invention discloses a broadcast assembly comprising a docking station, to which a speaker is engaged, and a pair of earbuds. Either the speaker or the earbuds can be paired with an electronic device for broadcasting an audio signal for group or individual enjoyment, respectively.

(2) Description of Related Art Including Information Disclosed Under 37 CFR 1.97 and 1.98

The prior art relates to broadcast assemblies. Related prior art broadcast assemblies may comprise headphones also employable as wireless speakers, wireless speakers, and earbud docking assemblies. What is lacking in the prior art is a broadcast assembly comprising a docking station, to which a speaker is engaged, and a pair of earbuds. Either the speaker or the earbuds can be paired with an electronic device for broadcasting an audio signal for group or individual enjoyment, respectively.

BRIEF SUMMARY OF THE INVENTION

An embodiment of the disclosure meets the needs presented above by generally comprising a pair of earbuds and a docking station. Each earbud is configured to selectively engage a respective ear of a user so that the earbud is removably engaged to the respective ear. The earbuds are configured to receive wirelessly an audio signal from an electronic device and to broadcast the audio signal into the ears of the user. The docking station is configured to operationally engage the pair of earbuds so that the docking station is positioned to charge the pair of earbuds. The docking station also is configured to receive the audio signal from the electronic device. A dock speaker is engaged to the docking station and is positioned to selectively broadcast the audio signal.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

With reference now to the drawings, and in particular to FIGS. 1 through 6 thereof, a new broadcast assembly embodying the principles and concepts of an embodiment of the disclosure and generally designated by the reference numeral 10 will be described.

As best illustrated in FIGS. 1 through 6, the multimodal audio broadcast assembly 10 generally comprises a pair of earbuds 12 and a docking station 24. Each earbud 12 is configured to selectively engage a respective ear of a user so that the earbud 12 is removably engaged to the respective ear. The earbuds 12 are configured to receive wirelessly an audio signal from an electronic device (not shown, but including phones, tablets, portable media players, and the like) and to broadcast the audio signal into the ears of the user.

Each earbud 12 comprises a body 14, which is configured to engage a respective ear of the user. A bud battery 16 and a bud receiver 18 are positioned in the body 14. A bud speaker 20 is engaged to the body 14. The bud receiver 18 and the bud speaker 20 are operationally engaged to the bud battery 16. The bud receiver 18 is configured to receive the audio signal. The bud speaker 20 is configured to broadcast the audio signal into the respective ear of the user. A first connector 22 is engaged to the body 14 and is operationally engaged to the bud battery 16. As will be apparent to those skilled in the art of earphones, a wide variety of configurations of earbuds 12 are known.

The docking station 24 is configured to operationally engage the pair of earbuds 12 so that the docking station 24 is positioned to charge the pair of earbuds 12. The docking station 24 also is configured to receive the audio signal from the electronic device. A dock speaker 26 is engaged to the docking station 24 and is positioned to selectively broadcast the audio signal.

The docking station 24 comprises a housing 28, which defines an interior space 30. A dock battery 32, a microprocessor 34, and a dock receiver 36 are engaged to the housing 28 and are positioned in the interior space 30. The microprocessor 34 is operationally engaged to the dock battery 32, the dock receiver 36, and the dock speaker 26. The microprocessor 34 is positioned to selectively actuate the dock receiver 36. The dock receiver 36 is configured to receive an audio signal from the electronic device, positioning the microprocessor 34 to actuate the dock speaker 26 to broadcast the audio signal.

A lid 38 is hingedly engaged to the housing 28 and is positioned to selectively cover an upper face 40 of the housing 28. The dock speaker 26 is engaged to the housing 28 or to the lid 38. A pair of first recesses 42 positioned in the upper face 40 of the housing 28. Each first recess 42 is complementary to a respective earbud 12 so that the respective earbud 12 is at least partially insertable into the first recess 42 to removably engage the respective earbud 12 to the housing 28 and to operationally engage the earbud 12 to the dock battery 32 to charge the respective earbud 12. A pair of second recesses 44 is positioned in the lid 38, each second recess 44 is positioned for insertion of a portion 46 of a respective earbud 12 protruding from an associated first recess 42.

A pair of second connectors 48 is engaged to the housing 28. Each second connector 48 is operationally engaged to the dock battery 32 and is positioned in a respective first recess 42. The second connector 48 is positioned to selectively engage a first connector 22 of a respective earbud 12 upon insertion of the respective earbud 12 into the respective first recess 42.

The dock battery 32 is rechargeable via a port 50, which is engaged to the housing 28 and operationally engaged to the dock battery 32. The port 50 is configured to engage a plug of a charging cord (not shown) to charge the dock battery 32. The present invention also anticipates the dock battery 32 being configured for wireless charging. A charge indicator 52 is engaged to the housing 28 and is operationally engaged to the microprocessor 34. The microprocessor 34 is positioned to selectively actuate the charge indicator 52 to present a visual indication of a charge state of the dock battery 32.

Figure 1:
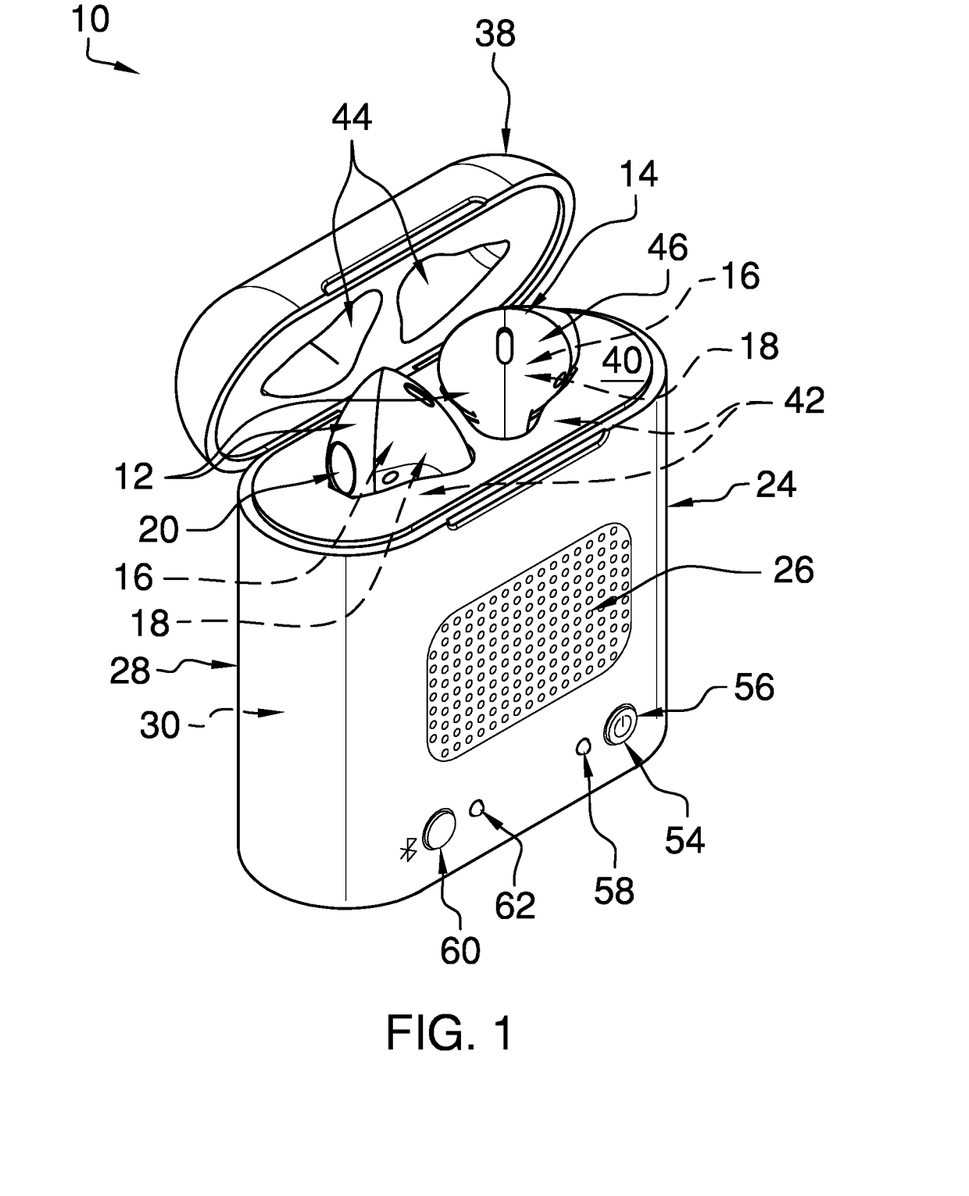
FIG. 1 is an isometric perspective view of a multimodal audio broadcast assembly according to an embodiment of the disclosure.
Figure 2:
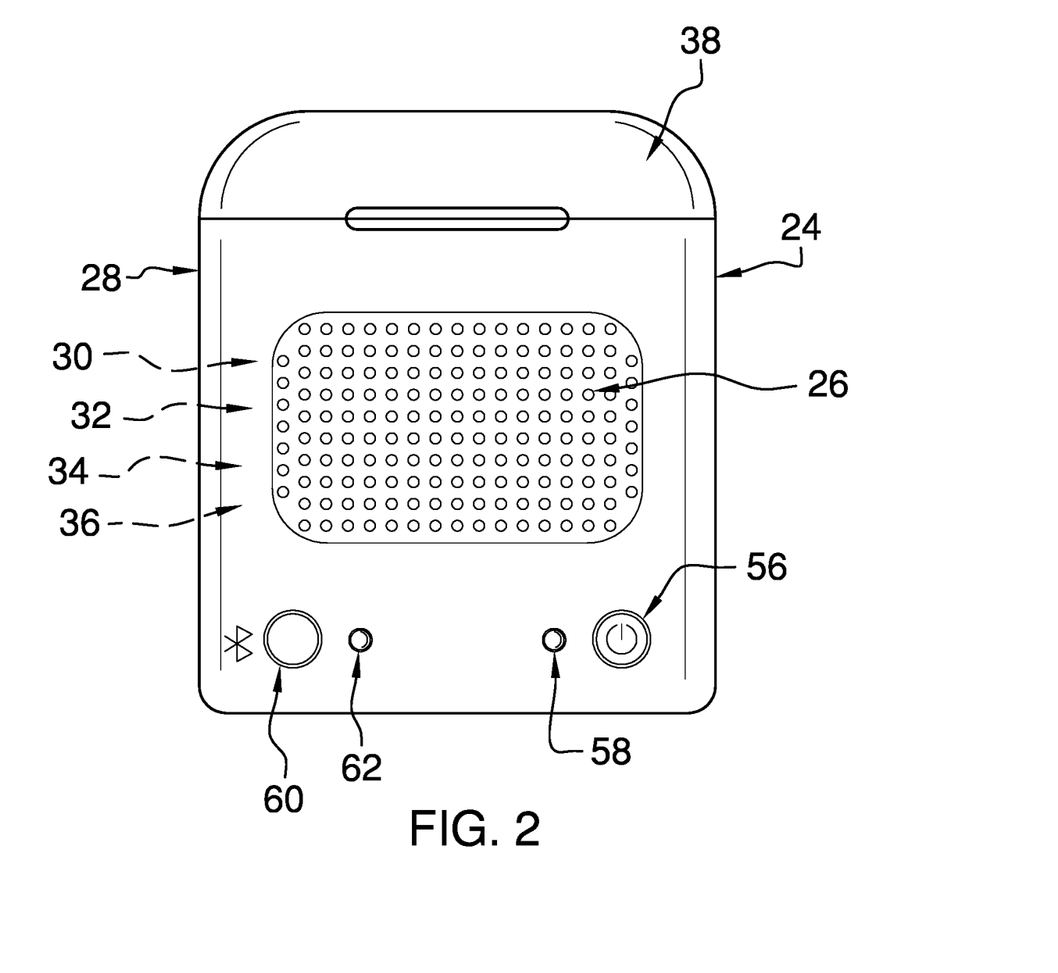
FIG. 2 is a front view of an embodiment of the disclosure.
Figure 3:
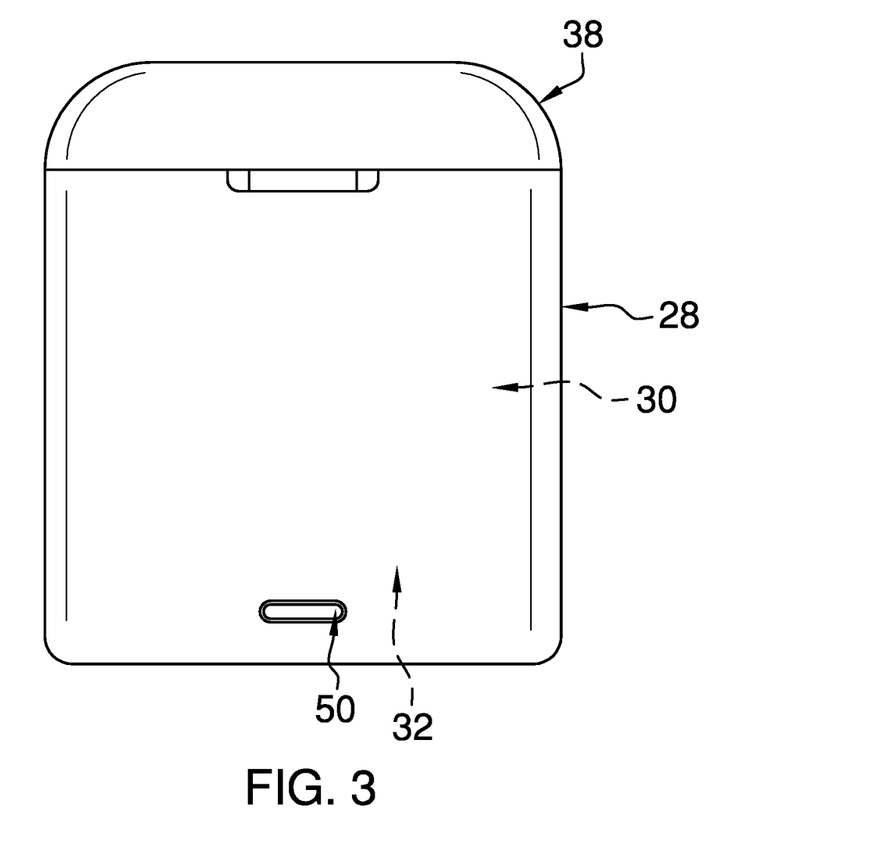
FIG. 3 is a rear view of an embodiment of the disclosure.
Figure 4:
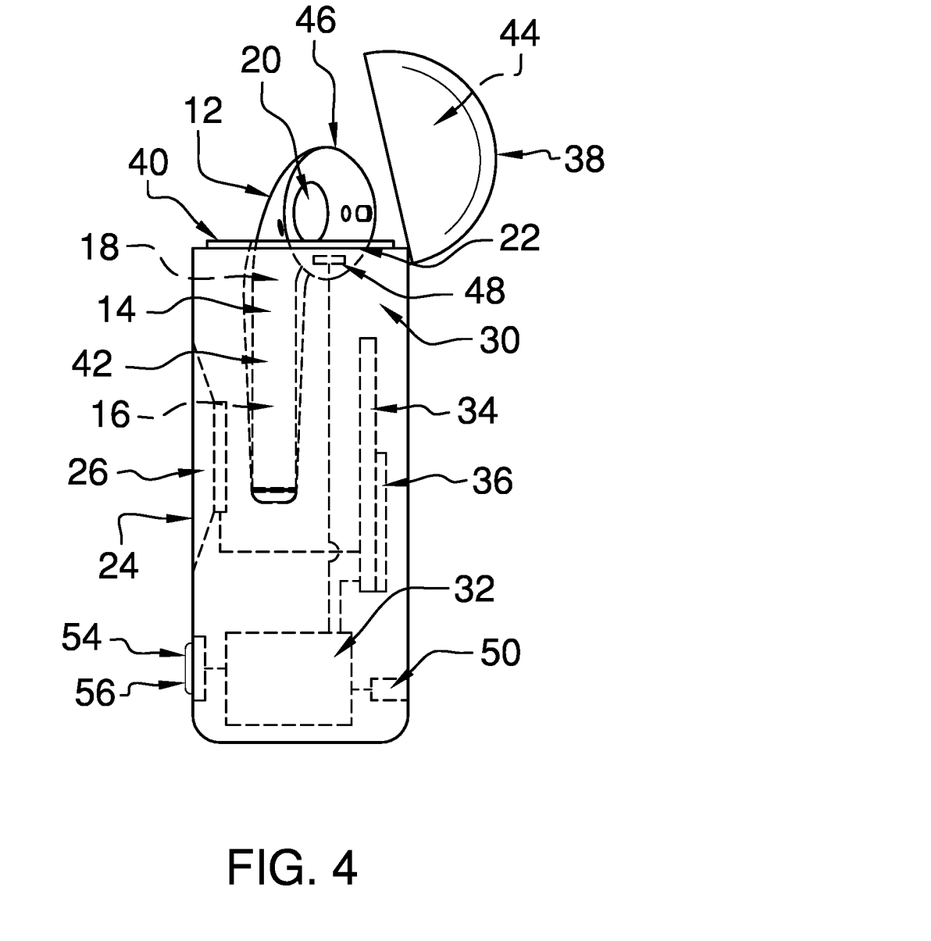
FIG. 4 is a side view of an embodiment of the disclosure.
Figure 5:
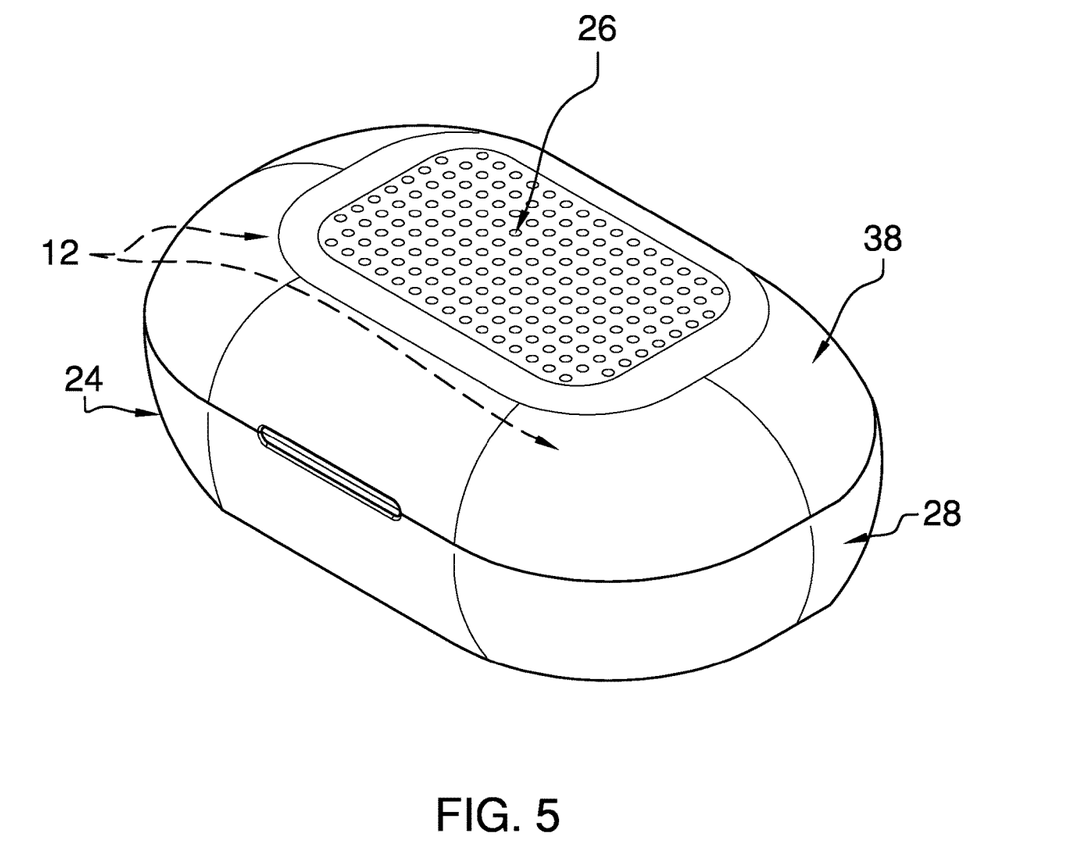
FIG. 5 is an isometric perspective view of an embodiment of the disclosure.
Figure 6:
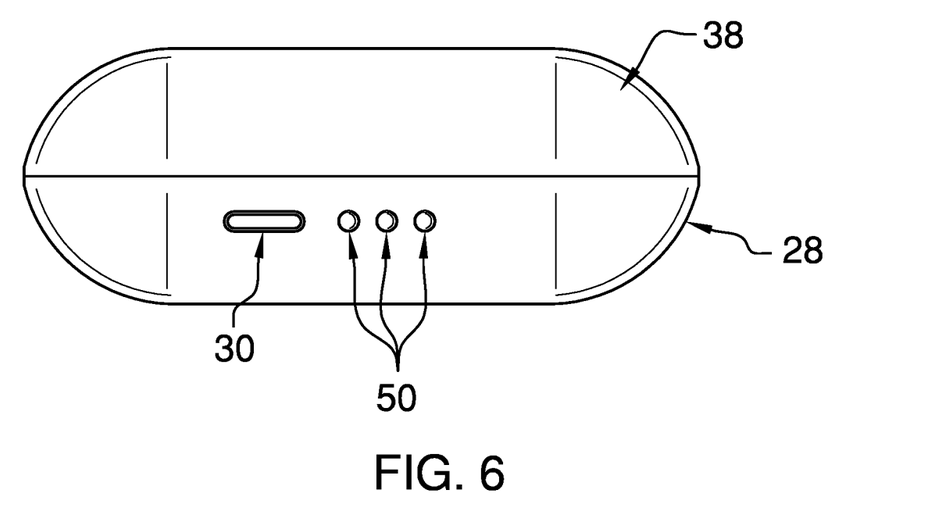
FIG. 6 is a rear view of an embodiment of the disclosure.

A switch 54 is engaged to the housing 28 and is operationally engaged to the dock battery 32 and the microprocessor 34. The switch 54 is configured to be selectively switched to operationally engage the microprocessor 34 to the battery. The switch 54 may comprise a push-button 56, as shown in FIG. 2, or other switching means, such as, but not limited to, toggles, slides, and the like. An indicator light 58 is engaged to the housing 28 and is operationally engaged to the microprocessor 34. The microprocessor 34 is positioned to selectively actuate the indicator light 58 to indicate an operational state of the docking station 24, for example, on or off.

A button 60, which is depressible, is engaged to the housing 28 and is operationally engaged to the microprocessor 34. The button 60 is configured to be selectively depressed to signal the microprocessor 34 to pair the dock receiver 36 with the electronic device. An indicating light 62 is engaged to the housing 28 and is operationally engaged to the microprocessor 34. The microprocessor 34 is positioned to selectively actuate the indicating light 62 to indicate a pairing state of the dock receiver 36, for example, illuminated for paired, blinking for active pairing, and off for unpaired.

In use, the earbuds 12 are removed from the docking station 24 and are positioned in the ears of the user. Upon pairing of the earbuds 12 with an electronic device, the user can listen individually to an audio broadcast. Should the user wish to share the audio broadcast with others, the earbuds 12 are replaced in the docking station 24, which causes them to unpair with the electronic device. The user then pushes the button 60 so that the dock receiver 36 pairs with the electronic device and the audio signal is broadcast from the dock speaker 26.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A multimodal audio broadcast assembly comprising:
   a pair of earbuds, each earbud being configured for selectively engaging a respective ear of a user, such that the earbud is removably engaged to the respective ear, the earbuds being configured for wirelessly receiving an audio signal from an electronic device and for broadcasting the audio signal into the ears of the user;
   a docking station configured for operationally engaging the pair of earbuds, such that the docking station is positioned for charging the pair of earbuds, the docking station being configured for receiving the audio signal from the electronic device; and
   a dock speaker engaged to the docking station, wherein the dock speaker is positioned for selectively broadcasting the audio signal;
   wherein each earbud comprises:
      a body configured for engaging the respective ear of the user,
      a bud battery positioned in the body,
      a bud receiver positioned in the body and operationally engaged to the bud battery, wherein the bud receiver is configured for receiving the audio signal, and
      a bud speaker engaged to the body and operationally engaged to the bud battery, wherein the bud speaker is configured for broadcasting the audio signal into the respective ear of the user; and
   wherein the docking station comprises:

a housing defining an interior space, a dock battery engaged to the housing and positioned in the interior space, the dock battery being rechargeable, a microprocessor engaged to the housing, positioned in the interior space, and operationally engaged to the dock battery and the dock speaker, a dock receiver engaged to the housing, positioned in the interior space, and operationally engaged to the microprocessor, such that the microprocessor is positioned for selectively actuating the dock receiver, wherein the dock receiver is configured for receiving the audio signal from the electronic device, positioning the microprocessor for actuating the dock speaker for broadcasting the audio signal, a port engaged to the housing and being operationally engaged to the dock battery, wherein the port is configured for engaging a plug of a charging cord for charging the dock battery, an indicator light engaged to the housing and being operationally engaged to the microprocessor, such that the microprocessor is positioned for selectively actuating the indicator light for indicating an operational state of the docking station, and an indicating light engaged to the housing and being operationally engaged to the microprocessor, such that the microprocessor is positioned for selectively actuating the indicating light for indicating a pairing state of the dock receiver.

2. The multimodal audio broadcast assembly of claim 1, further including a switch engaged to the housing and operationally engaged to the dock battery and the microprocessor, wherein the switch is configured being selectively switched for operationally engaging the microprocessor to the dock battery.

3. The multimodal audio broadcast assembly of claim 1, further including a button engaged to the housing and being operationally engaged to the microprocessor, the button being depressible, wherein the button is configured for being depressed for signaling the microprocessor for pairing the dock receiver with the electronic device.

4. The multimodal audio broadcast assembly of claim 1, further including a charge indicator engaged to the housing and being operationally engaged to the microprocessor, such that the microprocessor is positioned for selectively actuating the charge indicator for presenting a visual indication of a charge state of the dock battery.

5. The multimodal audio broadcast assembly of claim 1, further including a pair of first recesses positioned in an upper face of the housing, each first recess being complementary to a respective earbud, such that the respective earbud is positioned for at least partial insertion into the first recess for removably engaging the respective earbud to the housing and for operationally engaging the earbud to the dock battery for charging the respective earbud.

6. The multimodal audio broadcast assembly of claim 5, further including:

each earbud comprising a first connector engaged to the body and operationally engaged to the bud battery; and a pair of second connectors, each second connector being engaged to the housing, operationally engaged to the dock battery, and positioned in a respective first recess, such that the second connector is positioned for selectively engaging the first connector of the respective earbud upon insertion of the respective earbud into the respective first recess.

7. The multimodal audio broadcast assembly of claim 1, further including a lid hingedly engaged to the housing, such that the lid is positioned for selectively covering the upper face.

8. The multimodal audio broadcast assembly of claim 7, further including a pair of second recesses positioned in the lid, each second recess being positioned for insertion of a portion of a respective earbud protruding from an associated first recess.

9. The multimodal audio broadcast assembly of claim 7, wherein the dock speaker is engaged to the lid.

10. The multimodal audio broadcast assembly of claim 1, wherein the dock speaker is engaged to the housing.

11. A multimodal audio broadcast assembly comprising:

a pair of earbuds, each earbud being configured for selectively engaging a respective ear of a user, such that the earbud is removably engaged to the respective ear, the earbuds being configured for wirelessly receiving an audio signal from an electronic device and for broadcasting the audio signal into the ears of the user, each earbud comprising:

a body configured for engaging the respective ear of the user, a bud battery positioned in the body, a bud receiver positioned in the body and operationally engaged to the bud battery, wherein the bud receiver is configured for receiving the audio signal, a bud speaker engaged to the body and operationally engaged to the bud battery, wherein the bud speaker is configured for broadcasting the audio signal into the respective ear of the user, and a first connector engaged to the body and operationally engaged to the bud battery;

a docking station configured for operationally engaging the pair of earbuds, such that the docking station is positioned for charging the pair of earbuds, the docking station being configured for receiving the audio signal from the electronic device, the docking station comprising:

a housing defining an interior space, a dock battery engaged to the housing and positioned in the interior space, the dock battery being rechargeable, a port engaged to the housing and being operationally engaged to the dock battery, wherein the port is configured for engaging a plug of a charging cord for charging the dock battery, a microprocessor engaged to the housing, positioned in the interior space, and operationally engaged to the dock battery, a charge indicator engaged to the housing and being operationally engaged to the microprocessor, such that the microprocessor is positioned for selectively actuating the charge indicator for presenting a visual indication of a charge state of the dock battery, a switch engaged to the housing and operationally engaged to the dock battery and the microprocessor, wherein the switch is configured being selectively switched for operationally engaging the microprocessor to the dock battery, an indicator light engaged to the housing and being operationally engaged to the microprocessor, such that the microprocessor is positioned for selectively actuating the indicator light for indicating an operational state of the docking station, a dock receiver engaged to the housing, positioned in the interior space, and operationally engaged to the microprocessor, such that the microprocessor is positioned for selectively actuating the dock receiver, a button engaged to the housing and being operationally engaged to the microprocessor, the button being depressible, wherein the button is configured for being depressed for signaling the microprocessor for pairing the dock receiver with the electronic device, an indicating light engaged to the housing and being operationally engaged to the microprocessor, such that the microprocessor is positioned for selectively actuating the indicating light for indicating a pairing state of the dock receiver, a pair of first recesses positioned in an upper face of the housing, each first recess being complementary to the respective earbud, such that the respective earbud is positioned for at least partial insertion into the first recess for removably engaging the respective earbud to the housing and for operationally engaging the earbud to the dock battery for charging the respective earbud, a pair of second connectors, each second connector being engaged to the housing, operationally engaged to the dock battery, and positioned in a respective first recess, such that the second connector is positioned for selectively engaging a first connector of the respective earbud upon insertion of the respective earbud into the respective first recess, a lid hingedly engaged to the housing, such that the lid is positioned for selectively covering the upper face, and a pair of second recesses positioned in the lid, each second recess being positioned for insertion of a portion of the respective earbud protruding from an associated first recess; and a dock speaker engaged to the docking station, wherein the dock speaker is positioned for selectively broadcasting the audio signal, the dock speaker being operationally engaged to the microprocessor, wherein the dock receiver is configured for receiving the audio signal from the electronic device, positioning the microprocessor for actuating the dock speaker for broadcasting the audio signal, the dock speaker being engaged to the housing or to the lid.

* * * * *